(12) United States Patent
McConnell

(10) Patent No.: US 8,434,729 B2
(45) Date of Patent: May 7, 2013

(54) TRIVET WITH SERVER LID

(75) Inventor: Tara McConnell, Exton, PA (US)

(73) Assignee: Temp-tations LLC, Exton, PA (US)

( * ) Notice: Subject to any disclaimer, the term of this patent is extended or adjusted under 35 U.S.C. 154(b) by 171 days.

(21) Appl. No.: 13/036,975

(22) Filed: Feb. 28, 2011

(65) Prior Publication Data

US 2011/0147559 A1 Jun. 23, 2011

Related U.S. Application Data

(63) Continuation-in-part of application No. 11/993,721, filed as application No. PCT/US2006/024402 on Jun. 21, 2006.

(60) Provisional application No. 60/692,874, filed on Jun. 21, 2005, provisional application No. 60/776,141, filed on Feb. 22, 2006, provisional application No. 60/776,099, filed on Feb. 22, 2006.

(51) Int. Cl.
*A47G 29/00* (2006.01)
*A47J 27/00* (2006.01)

(52) U.S. Cl.
USPC ............... 248/346.03; 248/117.1; 248/349.1; 248/176.2; D7/388; D6/403; 220/743; 220/573.1; 99/426

(58) Field of Classification Search ............ 248/346.03, 248/117.1, 117.2, 349.1, 117.3, 153, 175, 248/176.2; D7/388; D6/403; 220/743, 491, 220/573.1, 756; 99/426; 108/138–140
See application file for complete search history.

(56) References Cited

U.S. PATENT DOCUMENTS

| 2,101,487 | A |   | 12/1937 | Anderson |
| 2,240,602 | A | * | 5/1941 | Bartsch ................. 220/574.2 |
| 2,264,128 | A |   | 11/1941 | Branch |
| 2,686,862 | A |   | 8/1954 | Morrison et al. |
| 2,913,121 | A | * | 11/1959 | Randolph-Randolph ..... 210/470 |
| 2,950,840 | A | * | 8/1960 | Lewerth ................... 220/212.5 |
| 2,951,610 | A | * | 9/1960 | Smalley, Jr. ................ 220/575 |
| 3,141,090 | A | * | 7/1964 | Batcher ....................... 219/438 |
| 3,225,938 | A | * | 12/1965 | Von Brömssen ............... 211/85 |
| D258,631 | S |   | 3/1981 | Lax |
| 4,378,397 | A |   | 3/1983 | Sussman |
| 4,550,894 | A |   | 11/1985 | Barlics |
| D292,357 | S |   | 10/1987 | Narain |
| 4,782,745 | A | * | 11/1988 | George, Jr. ..................... 99/483 |
| 4,852,760 | A | * | 8/1989 | Sarnoff et al. .............. 220/743 |
| 5,077,460 | A | * | 12/1991 | Rocha et al. ............... 219/217 |
| 5,485,937 | A |   | 1/1996 | Tseng |
| 5,503,062 | A | * | 4/1996 | Buff, IV ........................ 99/426 |
| 5,616,392 | A | * | 4/1997 | Treutwein ....................... 428/80 |
| 5,644,976 | A |   | 7/1997 | Muchin et al. |
| D411,058 | S |   | 6/1999 | Sellers |
| 6,067,698 | A |   | 5/2000 | Silvera-Langley |
| 6,142,332 | A |   | 11/2000 | Ferrara |

(Continued)

*Primary Examiner* — Anita M King

(74) *Attorney, Agent, or Firm* — Schmeiser, Olsen & Watts LLP

(57) ABSTRACT

A multifaceted trivet with multifaceted functionality includes a trivet within a basket, a trivet that may serve as a lid and a serving tray. The trivet within a basket provides further insulation by use of the basket. The basket has rotatable handles which allows a heated item to be placed within the basket and easily carried to a serving area. The trivet that may serve as a lid may function as a trivet on which a pot or container may be placed or may fit as a lid of a particular pot or container.

20 Claims, 10 Drawing Sheets

U.S. PATENT DOCUMENTS

| | | | | |
|---|---|---|---|---|
| 6,164,194 A | * | 12/2000 | Westmoreland | 99/426 |
| 6,595,120 B1 | | 7/2003 | Tiemann | |
| 6,637,614 B2 | | 10/2003 | Bergkvist | |
| 6,668,708 B1 | | 12/2003 | Swinford et al. | |
| 7,344,173 B2 | * | 3/2008 | Gonzalez et al. | 294/27.1 |
| 7,414,229 B2 | | 8/2008 | Hellmann et al. | |
| 7,735,651 B2 | | 6/2010 | Shew et al. | |
| 2003/0192480 A1 | | 10/2003 | Bennett | |
| 2004/0262322 A1 | | 12/2004 | Middleton et al. | |
| 2005/0040309 A1 | | 2/2005 | Paine | |
| 2008/0110914 A1 | | 5/2008 | Anderson et al. | |

* cited by examiner

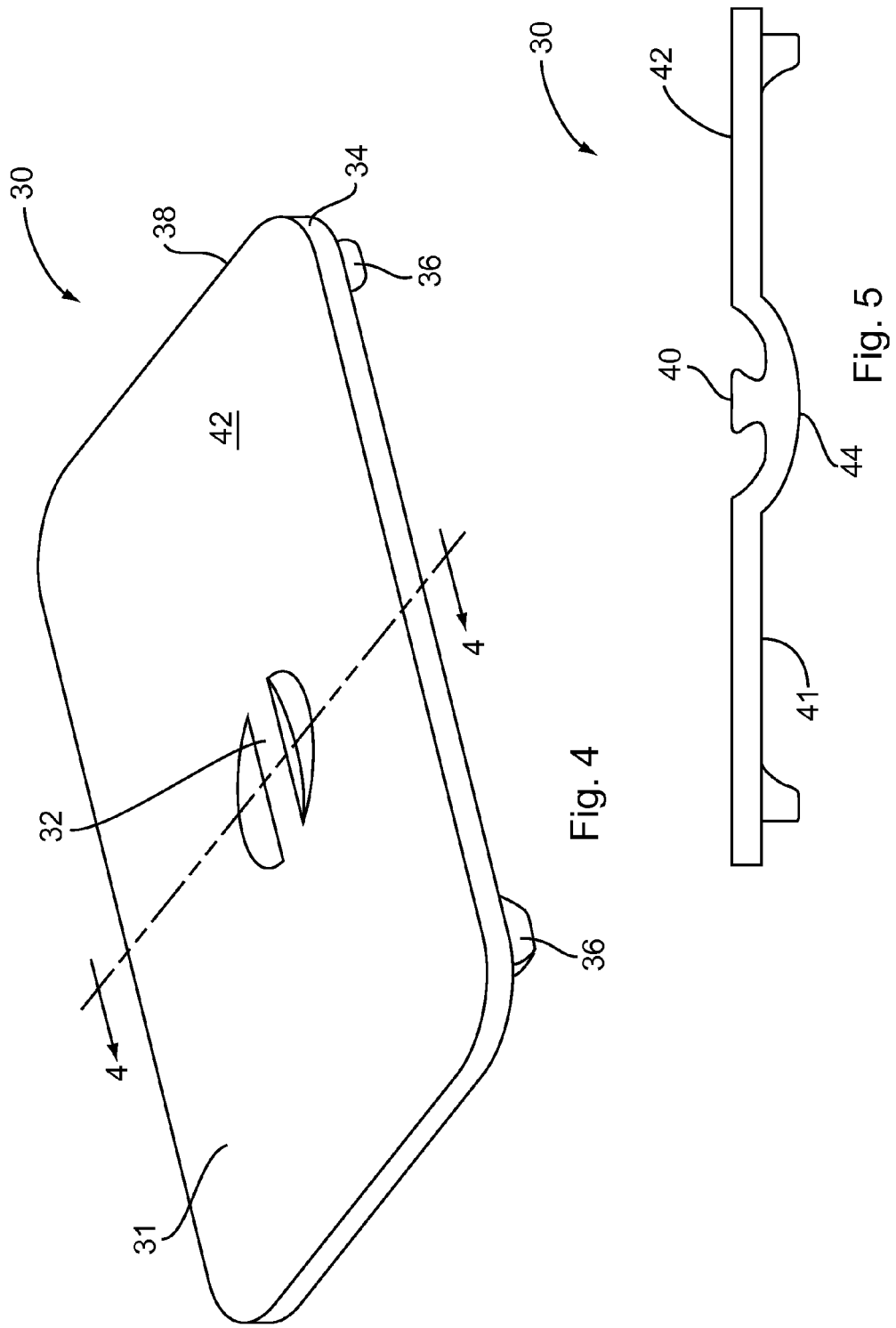

TRIVET WITH SERVER LID

CROSS REFERENCE TO RELATED APPLICATION

This application is a continuation-in-part of U.S. patent application Ser. No. 11/993,721, filed Dec. 21, 2007, which claims priority to PCT/US2006/024402 filed Jun. 21, 2006; to U.S. Provisional Patent Application Ser. No. 60/692,874, filed Jun. 21, 2005; to U.S. Provisional Patent Application Ser. No. 60/776,141, filed Feb. 22, 2006; and to U.S. Provisional Patent Application Ser. No. 60/776,099, filed Feb. 23, 2006, the disclosures of which are hereby incorporated entirely herein by reference.

BACKGROUND OF THE INVENTION

1. Technical Field

Generally this invention relates to trivets. More specifically, the invention is a multifaceted trivet having a plurality of uses.

2. State of the Art

Given the state of modern cooking and the preference to have a certain level of economy for the clean up, it is common to utilize the same containers for cooking, heating and serving. Accordingly, it is often the case that a hot cooking container is not placed on the dining table for serving purposes to prevent burning or marking of the table. There is wide spread usage of trivets. Trivets come in a variety of configurations and materials which have one common purpose of insulating hot containers from the surface upon which they are placed. Accordingly, trivets have a certain level of heat resistance so that the top surface upon which a container is placed may be kept heat safe. Depending on the material used for the trivets and the trivet configuration, it is common for the trivet to be heat safe in a range of 320° to 675° Fahrenheit.

Additionally trivets may have legs which lift them off the surface of the table on which they are placed. This separation acts as further insulation to prevent damage to the tabletop. However, some trivets are also mat like and may be laid flat upon the table surface with the heated container placed on top. Often such mat-like-trivets are made of highly insulated material such as ceramic in order to be usable with extremely hot containers.

Another challenge which is often faced when serving hot containers is the movement of the container from the kitchen area to the serving area. Often potholders are used to handle these containers. However, it is not uncommon for potholders to fail to provide a sufficient grip or not fully cover the heated surface which can result in injury to the server and others should the container be dropped. In addressing this issue, it is common to use serving trays of various types which have handles that are sufficiently removed from the heated container to allow the server to deliver the heated container to the serving table. Often these serving trays are placed right on the table and also functioned to insult the heated container from the tabletop.

While trivets are very useful for their intended purpose however due to the fact that they have only a singular usage purchasers often do not wish to buy a large number of trivets. Furthermore, since space is almost always an issue in kitchens, the number of trivets is often kept to a minimum. The difficulty with this is that when making a large meal, with numerous hot items, one may find they do not have a sufficient number of trivets to meet their needs.

Difficulties also arise when it becomes necessary to move the high temperature container and the trivet upon which it rests. This is of special concern due to the fact that the container and its ingredients are normally so hot that they can cause burning of an individual's skin. Further, it is sometimes difficult to carry the heated container to the table upon which it will rest.

Accordingly, there is a need in the field of trivets for a multifaceted trivet for addressing the various needs and uses of trivets.

DISCLOSURE OF THE INVENTION

This invention provides for a trivet with multifaceted functionality including a trivet within a basket, the basket providing further insulation, wherein the basket has serving handles which allows a heated item to be place within the basket and easily carried to a serving area; a trivet that may serve as a lid on which a pot or container may be placed or which may fit as a lid of a particular pot or container; and a trivet having a rotatable base.

One aspect of the present invention may include a multifaceted trivet comprising a basket having a bottom surface, sidewalls and an opening, wherein the bottom surface includes a predetermined size and shape and handles coupled to opposing sidewalls of the basket. The multifaceted trivet may further comprise feet coupled to a bottom side of the bottom surface of the basket, the feet raising the bottom surface a predetermined distance, and a trivet removably coupled to the bottom surface of the basket. The size and shape of the bottom surface of the basket corresponds to the size and shape of the trivet such that there is no substantial movement of the trivet once it is in the basket. This combination of features allows not only for convenience in serving but also economy in space usage which is often important in a kitchen setting.

Another aspect of the present invention may include a multifaceted trivet comprising a body portion having a top surface, a bottom surface and a lip around the outer periphery of the body portion and a handle coupled to the top surface of the body portion. The multifaceted trivet may include feet coupled to the bottom surface of the body portion, the feet lifting the body portion a predetermined distance. The multifaceted trivet is moveable between a position as a lid on a serving dish with the lip resting on sidewalls of the dish and the feet fitting within the dish and a position as a trivet with the feet resting on a serving surface and the dish resting on the top surface of the body portion. The feet may generally be made out of some type of heat resistant material so that if the serving dish and trivet cover are heated the feet will not retain the heat, thus allowing them to be placed upon the table surface.

Yet another aspect of the present invention may include a multifaceted trivet comprising a trivet having a top surface and a bottom surface, wherein the top surface supports a serving dish. The multifaceted trivet may further include a rotatable base coupled to the bottom surface, the rotatable base rotating to provide access to the serving dish by various users. In particular embodiments and for increased versatility, the trivet with a rotatable base may comprise a basket to aid in the transport of the trivet and any heated serving dish resting thereon. The basket may also be configured with wheels that further enable movement of the trivet with any heated serving dish about the serving surface. It should be appreciated that the trivet of the subject invention could be of any preferred shape or dimensions.

The foregoing and other features and advantages of the present invention will be apparent in the following more detailed description of the particular embodiments of the invention, as illustrated in the accompanying drawings.

BRIEF DESCRIPTION OF THE DRAWINGS

FIG. 4 is a prospective view of a multifaceted trivet that may serve as a lid in accordance with the present invention;

FIG. 5 is a cross-sectional view taken along lines 4-4 of FIG. 4 of a multifaceted trivet that may serve as a lid in accordance with the present invention;

DETAILED DESCRIPTION OF EMBODIMENTS OF THE INVENTION

As discussed above, this invention relates to a trivet with multifaceted functionality including a trivet within a basket, the basket providing further insulation, wherein the basket has serving handles which allows a heated item to be place within the basket and easily carried to a serving area; a trivet that may serve as a lid on which a pot or container may be placed or which may fit as a lid of a particular pot or container; and a trivet having a rotatable base.

Figure 1:
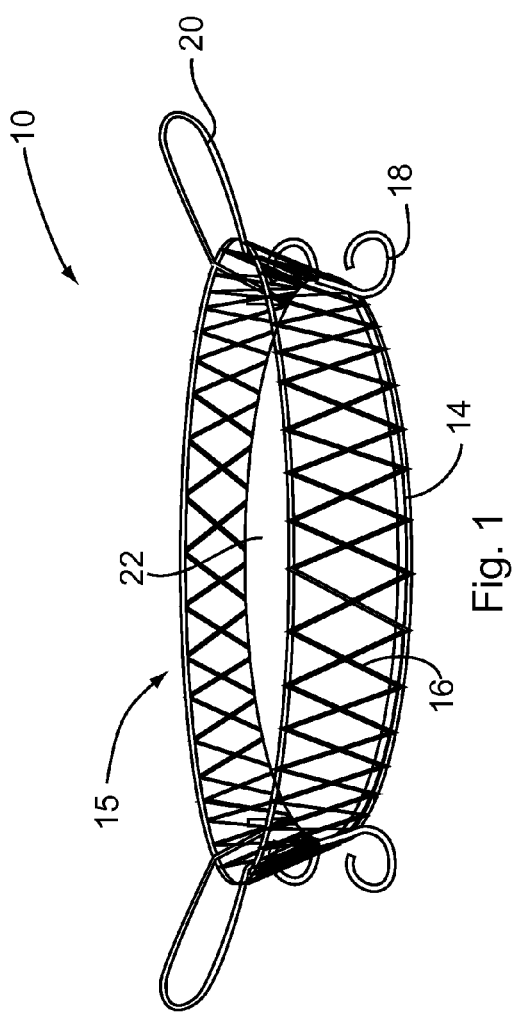
FIG. 1 is a perspective view of a multifaceted trivet within a basket in accordance with the present invention.
Figure 2:
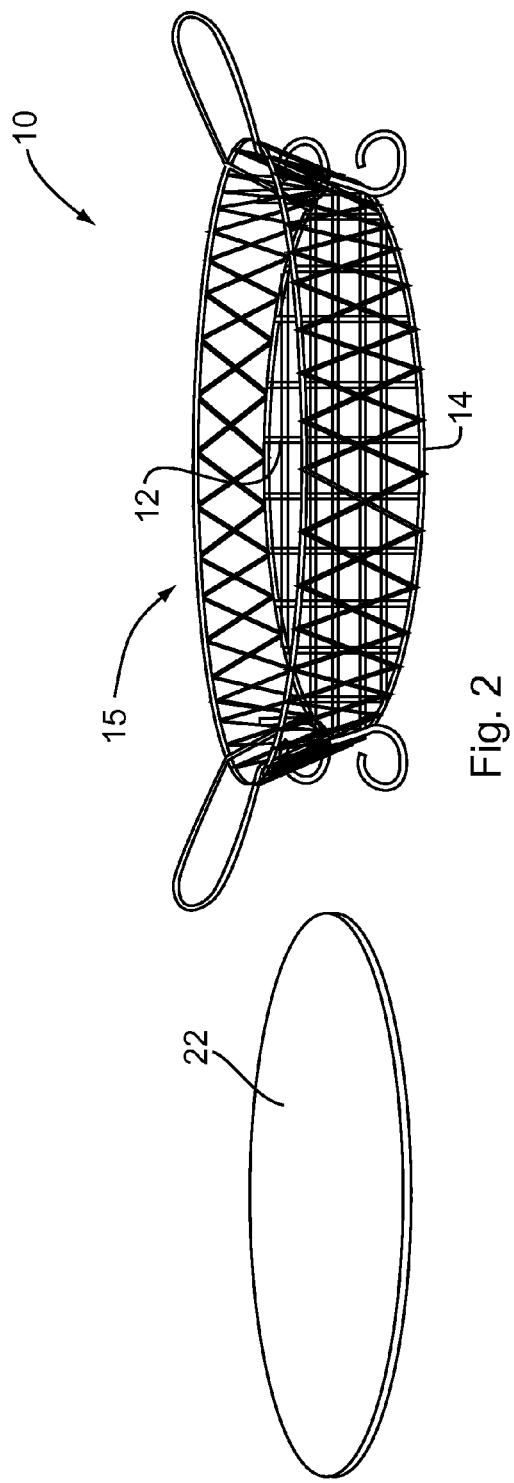
FIG. 2 is a perspective view of a multifaceted trivet removed from a basket in accordance with the present invention.

Particular embodiments of the present invention relate to a basket, trivet combination. As shown in FIGS. 1 and 2, a basket generally designated as 10 is formed of a wire grid 12. This grid 12 forms sufficient support across the bottom surface 14 to allow the basket to be used as a container for fruits or the like. The basket has sidewalls 16 which may also be made from wire. It should be appreciated that while particular embodiments disclose a wire basket, other materials besides wire could be used. For example, and without limitation, the basket could be made of wood, plastic, ceramic or any other material which has sufficient structural integrity to hold fruit or like items. The basket may also have an opening 15, wherein a serving dish may be placed within the basket 10 through the opening 15 and retained within the basket by the sidewalls 16 and the bottom surface 14. The basket 10 may also have feet 18 which serve to raise the bottom surface 14 off any serving surface a predetermined distance. On opposite sides of the basket 10 and secured to the sidewalls 16 may be handles 20 to allow the basket to be carried, used as a serving tray for hot items or to simply provide convenience for room temperature room food items such as fruit or the like. It will be understood that the handles may be made from any appropriate material and further, that they may also be insulated.

Figure 3A:
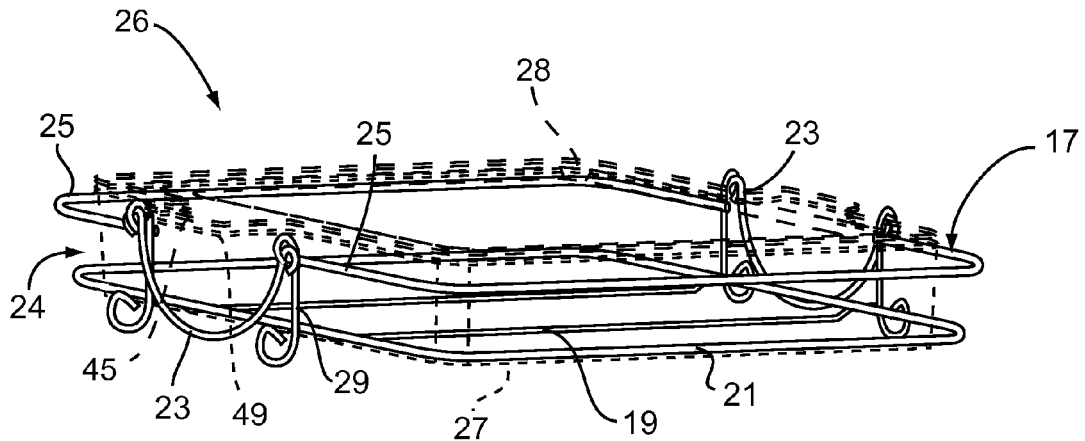
FIG. 3A is a perspective view of a basket having rotatable handles in the downward position in accordance with the present invention.
Figure 3B:
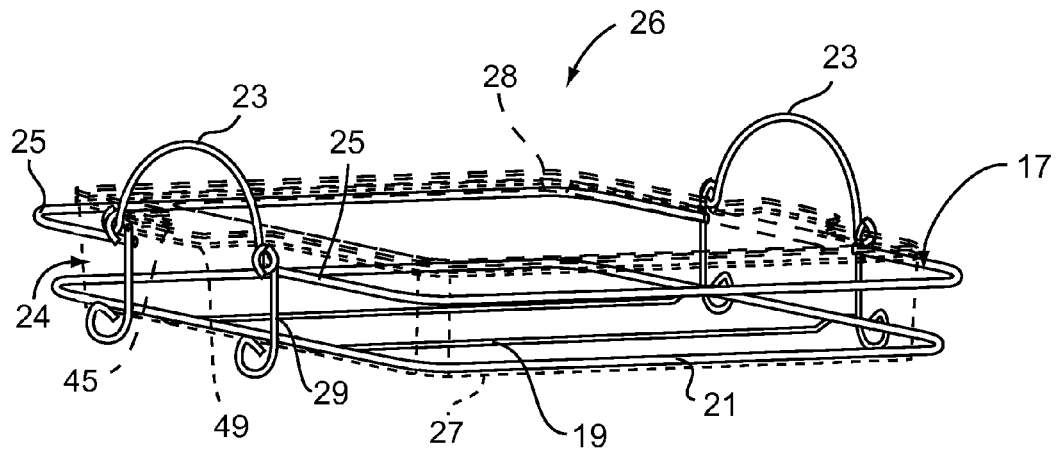
FIG. 3B is a perspective view of a basket having rotatable handles in the upward position in accordance with the present invention.

FIGS. 3A and 3B show basket 26 having a lower peripheral rim 21, an upper peripheral rim 25, vertical supports 29 securing the lower peripheral rim 21 to the upper peripheral rim 25, and at least one horizontal base support 19 secured at its ends to opposing sides of the lower peripheral rim 21. Handles 23 are rotatable between an upward position and a downward position. Sidewalls 24 are in an open configuration below where handles 23 are coupled to the upper peripheral rim 25 of basket 26. The upper peripheral rim 25 further comprises at least two segments, each segment being substantially U shaped, said U shaped segments opposing each other such that an uppermost portion of legs of the U face each other in a spaced apart relationship forming an upper rim opening 17 therebetween. When the serving dish 27 and lid 28 is placed in basket 26 the rotatable handles 23 are in the downward position. When the handles 23 are rotated to the upward position the serving dish 27 and lid 28 cannot be removed from basket 26. With the handles 23 in the upward position, attempted removal of the serving dish 27 or lid 28, will result in the respective handles 49 and 45 engaging the handles 23 of the basket 26. This results in prevention of removal of the serving dish 27 and lid 28.

The bottom surface of the basket may have a predetermined size and shape which may be of any desired configuration. The configuration may be, but is not limited to circular, oval, elongate or any other configuration that would be desirable for its intended usage. In one particular embodiment as shown in FIGS. 1 and 2, the bottom surface is circular. The size and shape of the bottom surface 14 of the basket 10 may correspond to the size and shape of a trivet 22. This correspondence of size and shape substantially prevents movement of the trivet 22 once coupled to the bottom surface 14 of the basket 10. The trivet 22 may be moveable between a first position coupled to the bottom surface 14 of the basket 10; with the basket 10 resting on a serving surface and a second position with the trivet 22 removed from the basket 10 and used separately resting on the serving surface. In this particular embodiment, the trivet 22 may be used to either line the basket 10 or may be removed and used separately. In particular embodiments, the use of the trivet 22 in either the first position or the second position may depend upon the heat of the serving dish. For example, and without limitation, the trivet 22 may be moved to the first position when a serving dish has heat greater than a heat that can be used with a trivet 22 in the second position. This configuration allows the server to determine whether the heat of the serving dish is so high as to require the trivet 22 to remain within the basket in a first position and obtain the additional benefit of having the basket bottom surface 14 lifted off the serving surface by the feet 18 or whether the heat would be sufficiently reduced by the trivet 22 alone if placed directly on the serving surface.

The trivet 22 may be made of any suitable material which is heat safe to a desired degree. For example, the trivet may be fern, rattan, ceramic, PVC and/or any other similar material which is heat resistant. It should also be appreciated that the trivets can be made in many different colors to provide a variety for the table setting.

In embodiments where the trivet 22 is made of rattan, there may be an outer circumference which is thicker than the remaining portions of the trivet 22 so as to at least partially lift the trivet from the tabletop and provide air space even when the container is placed upon the trivet 22 only.

Referring to the drawings, FIGS. 4 and 5 depict a trivet generally designated as 30 in accordance with particular embodiments of the present invention. The trivet 30 may comprise a body portion 31 having a top surface 42, a bottom surface 41 and a lip 38. The trivet 30 may also include a handle 32 coupled to the top surface 42 of the trivet 30. In particular embodiments of the present invention, the handle 32 may be a recessed handle 32 having a top surface 40 in substantially the same plane as the top surface 42 of the trivet 30, thus providing a flat surface upon which a heated container may be placed. Further, the trivet 30 may include feet 36 that may be coupled to the bottom surface 41 at corners 34 of the trivet 30. The feet 36 may lift the body portion 31 of the trivet 30 a predetermined distance.

Depending upon the size of the container or serving dish, the feet 36 may generally be short in nature so as to fit within the container but not interfere with the food products therein. In particular embodiments where the trivet 30 may be of a large size, it may be desirable to have a center support 44. The center support 44 may also be the bottom surface of the recessed handle 32.

Figure 6A:
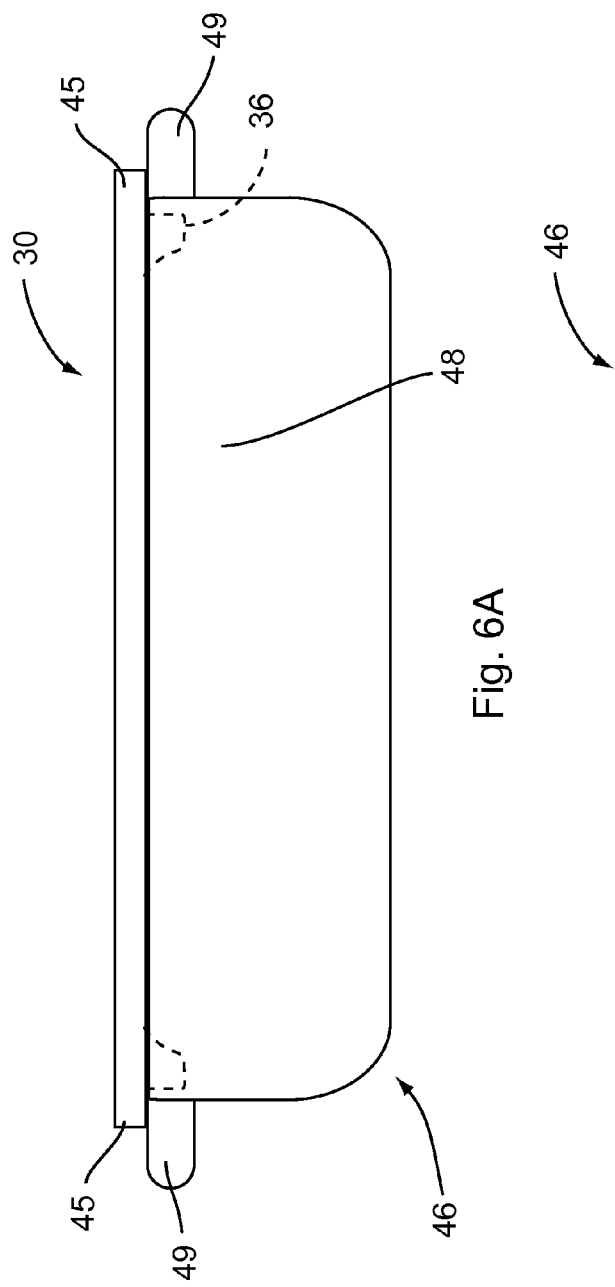
FIG. 6A is side plan view of a multifaceted trivet serving as a lid on a serving dish in accordance with the present invention.
Figure 6B:
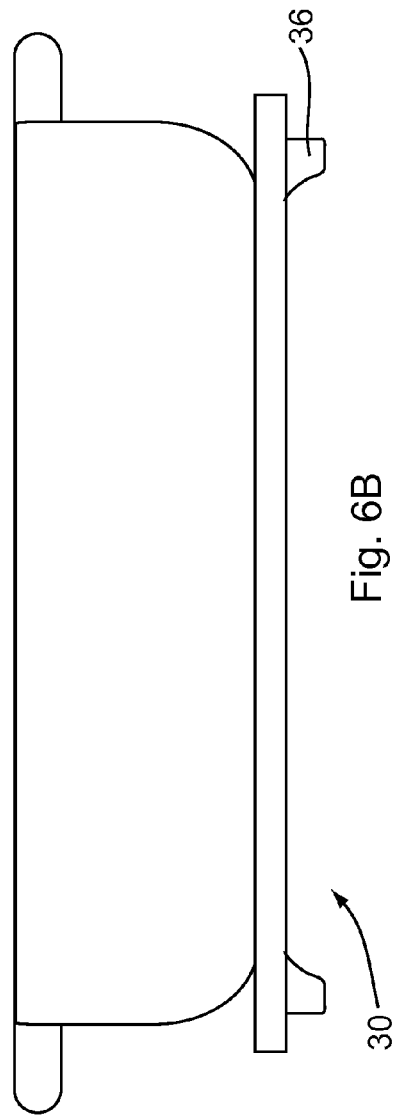
FIG. 6B is side plan view of a multifaceted trivet serving as a trivet and/or serving tray supporting a serving dish in accordance with the present invention.

With additional reference to FIGS. 6A and 6B, the lip 38 may be coupled around the outer periphery of the body portion 31 of the trivet 30. The lip 38 allows the trivet 30 to be placed over a heated container or serving dish 46 without interference of the feet 36. The trivet 30 may be moveable between a position as a lid and a position as a trivet. In the position as a lid the lip 38 may rest on sidewalls 48 of the serving dish 46, with the feet 36 fitting within the serving dish 46. In the position as a trivet, the feet 36 may rest on a serving surface and further the serving dish 46 may rest on the trivet 30.

The feet 36 may be made of any material suitable for not retaining heat so that the trivet 30, even if heated with the container or serving dish may be removed from its lid position and placed on the serving surface. The feet 36 may be made of a ceramic material which is substantially heat resistant or any other suitable material that would allow the trivet to be placed on the serving surface without marring the surface, such as silicone. The feet 36 may be heat resistant up to 675 degrees Fahrenheit and in particular embodiments, may have a higher heat resistance than the body portion 31 of the trivet 30.

Figure 7:
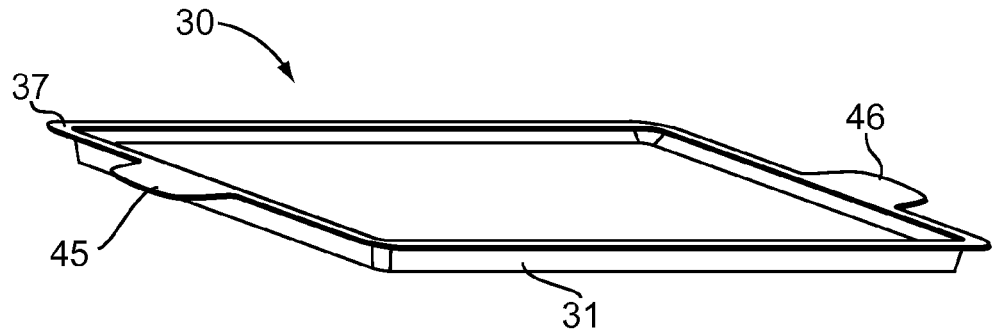
FIG. 7 is a perspective view of a multifaceted trivet that may serve as a lid in accordance with the present invention.
Figure 8A:
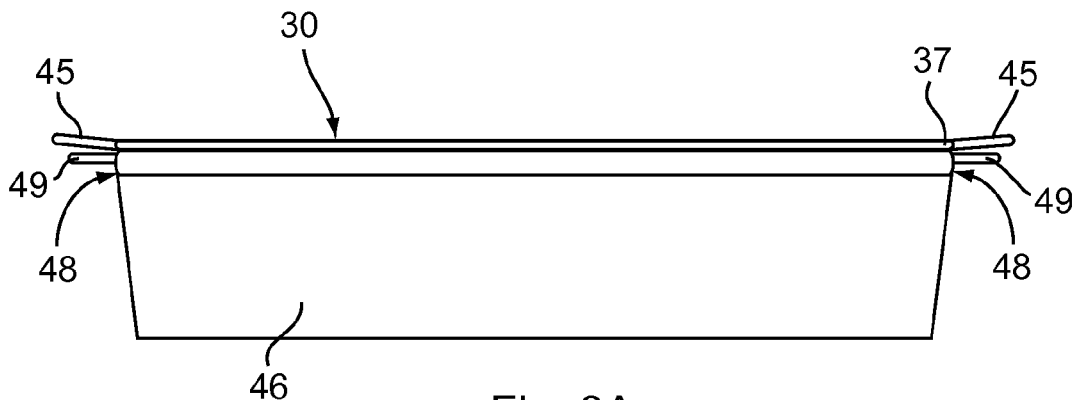
FIG. 8A is side plan view of a multifaceted trivet serving as a lid on a serving dish in accordance with the present invention.
Figure 8B:
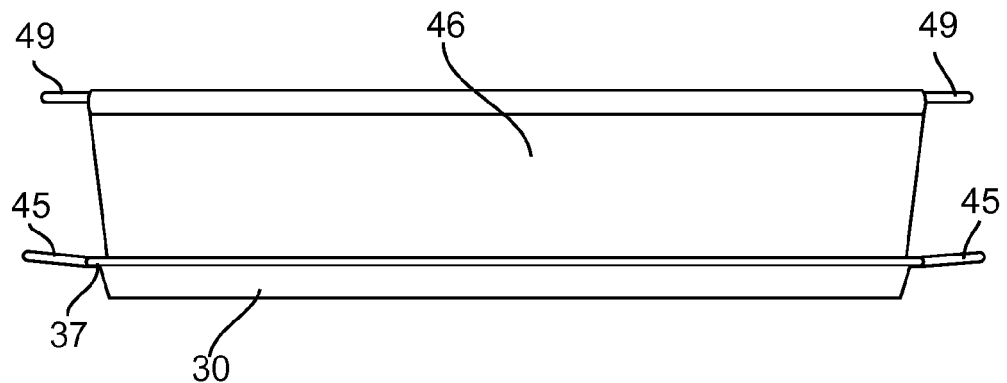
FIG. 8B is side plan view of a multifaceted trivet serving as a trivet and/or serving tray supporting a serving dish in accordance with the present invention.

If desirable, the trivet 30 may have other features as shown in FIG. 7, including but not limited to a ledge 37 around the periphery of the body portion 31 to prevent items from sliding off the trivet 30 and, in particular embodiments, to allow the trivet 30 to be used as a serving plate upon which the heated container is carried, as shown in FIG. 8B. Ledge 37 may be angled outward having handles 45 coupled to the outer surface of ledge 37. The handles 45 may be angled upwardly.

With additional reference to FIGS. 8A and 8B, the ledge 37 allows the trivet 30 to be nested in a heated container or serving dish 46. The trivet 30 may be moveable between a position as a lid and a position as a trivet and/or serving tray.

In the position as a lid the ledge 37 may partially rest on sidewalls 48 of the serving dish 46. Handles 45 may extend beyond handles 49 of serving dish 46 when the trivet is in position as a lid. In the position as a trivet or serving tray, the serving dish 46 may rest on the trivet 30 wherein the ledge 37 prevents the serving dish from sliding off the trivet during transport when in use as a serving tray. The trivet 30 may be any shape, including but not limited to rectangular, round, oval, square, and the like. The trivet 30 may be of a size and shape corresponding to a size and shape of the serving dish, wherein the trivet 30 may adequately serve as the lid of the serving dish.

Figure 9:
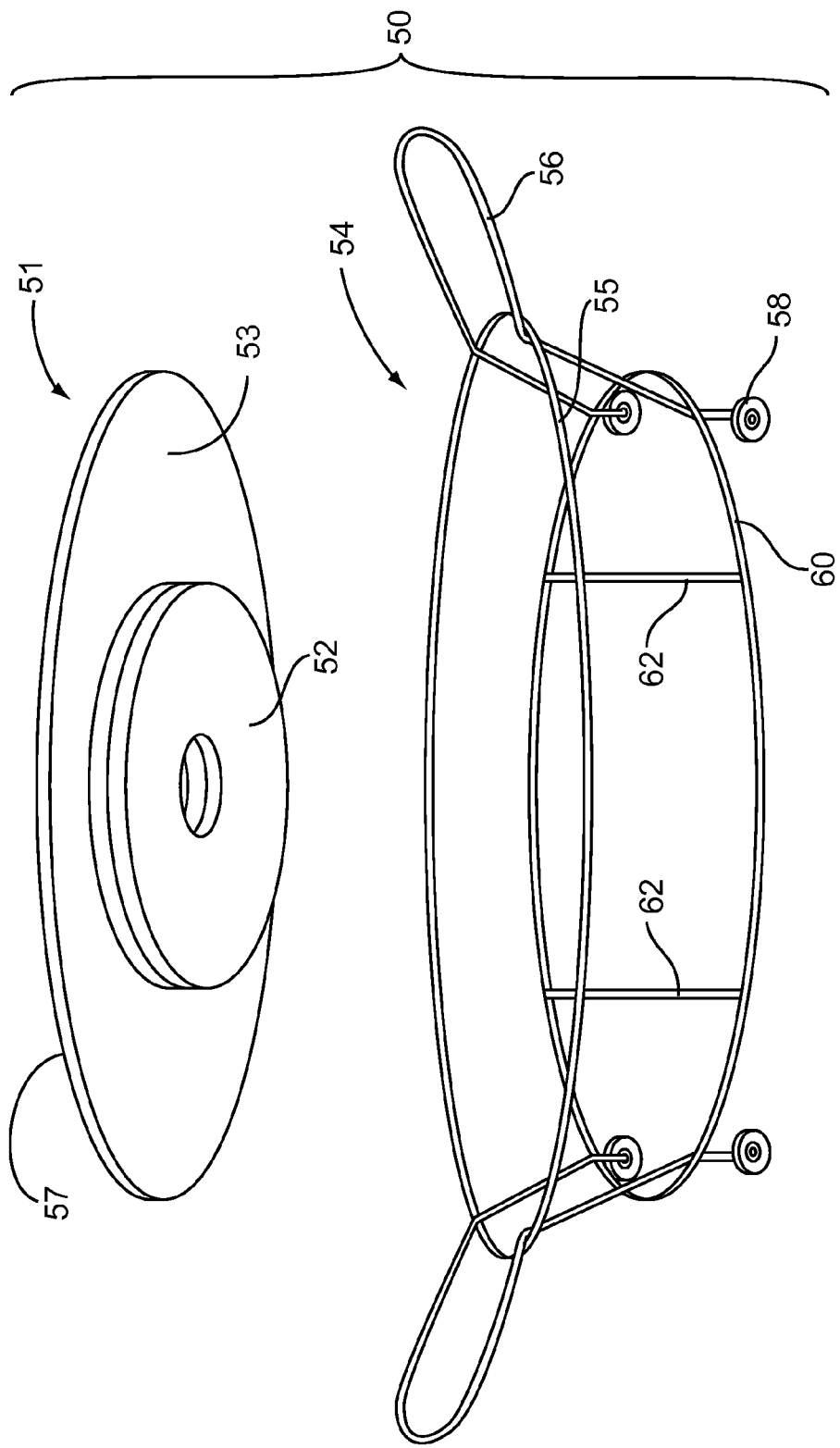
FIG. 9 is a side elevation view, partially exploded, showing a trivet with a rotatable central support in accordance with the present invention.

Referring again to the drawings, FIG. 9 depicts a multifaceted trivet 50 in accordance with particular embodiments of the present invention. The trivet portion 51 comprises a top surface 57 and a bottom surface 53. The trivet 51 may further comprise a rotatable base 52 coupled to the bottom surface 53 of the trivet 51. The top surface 57 of the trivet 51 may support a serving dish. The rotatable base 52 allows the trivet 51 to be rotated and allows access to the serving dish by a plurality of users. For example, and without limitation, a plurality of users may be seated around a table. The trivet 51 may be placed on the table with the base 52 contacting the table and supporting the trivet. A heated serving dish may then be placed on the trivet 51. The plurality of users may then rotate the trivet 51 by use of the rotatable base 52 to gain access to the food items within the serving dish. This particular embodiment allows for greater accessibility to the serving dish and ease in serving the food within the serving dish, while protecting the table from the heat of the serving dish.

The multifaceted trivet 50 may further include a basket 54 to transport the trivet 51 and the serving dish supported by the trivet 51. The basket 54 may have a base 60 and a top frame support 55. The basket 54 may further have handles 56 and wheels 58. The wheels 58 may be made of any suitable material including but not limited to nylon and enable movement of the trivet about a serving surface. Similarly, the basket 54 may be manufactured from any desirable material including but not limited to wire, which may or may not be coated. The base 60 of the basket 54 may have supports 62. The invention is configured such that the rotatable base 52 of the trivet 51 may be supported by the base 60 and the supports 62 of the basket 54 so that the trivet 51 rests substantially evenly within the basket 54. The basket may be an open configuration, and as or in an alternate embodiment could be enclosed.

The trivet 51 may be removed from the basket 54 and placed directly on the serving surface thereby functioning also as a rotating trivet. The trivet 51 may be made of any suitable material for protecting the table from heat including but not limited to wood, ceramics or the like.

Figure 10:
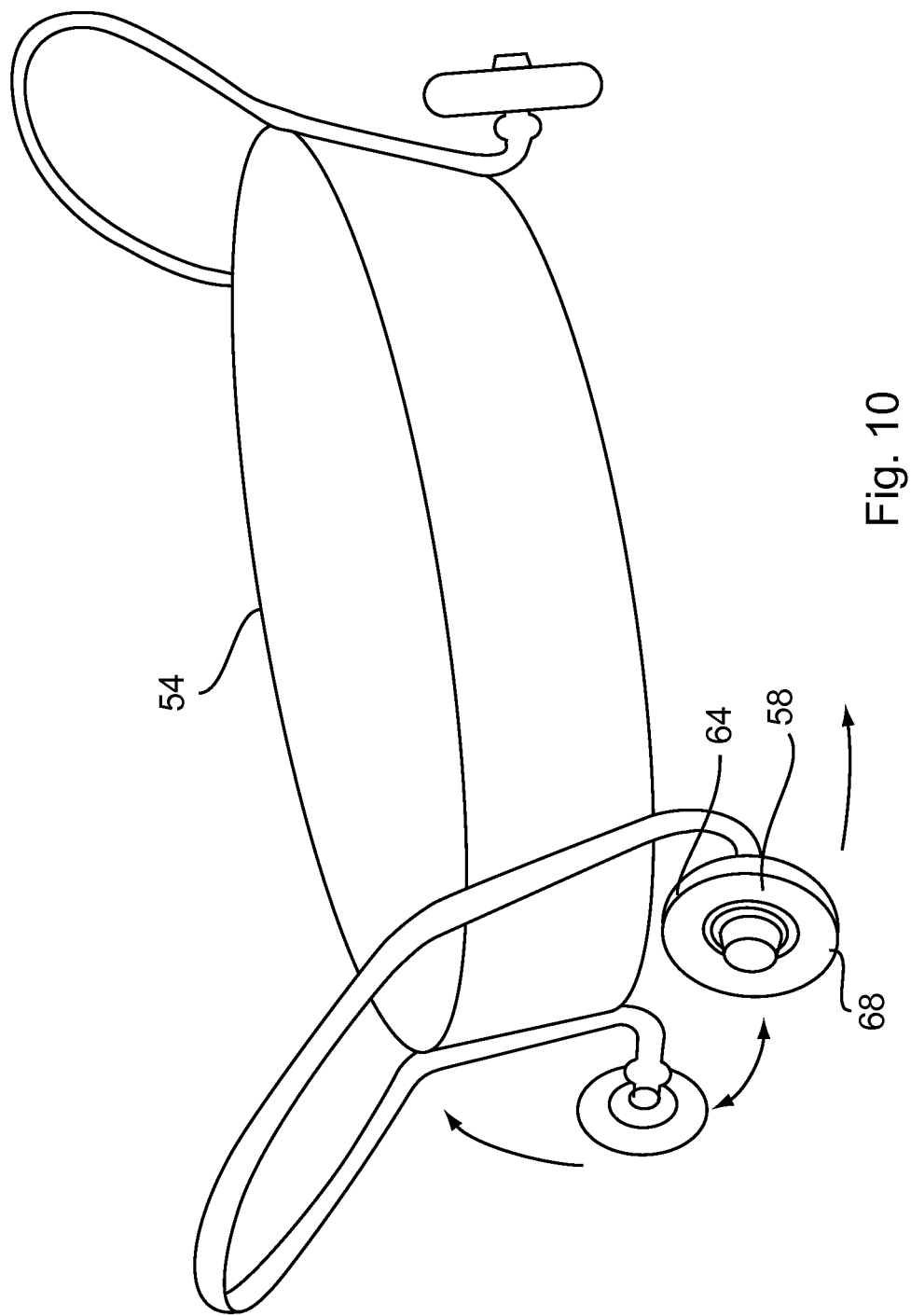
FIG. 10 is a perspective view of a trivet with a rotatable base in accordance with the present invention.

Referring further to the drawings, FIG. 10 shows a basket 54 with enlarged wheels 58 of a multifaceted trivet in accordance with particular embodiments of the present invention. The wheels 58 may be slanted so that a top portion 64 of the wheels 58 may be closer to the basket 54 than a bottom portion 68 of the wheels 58. By angling the wheels 58, the basket 54 may move in a more circular pattern. It should be appreciated that the shape of the basket may be oval, as shown in this figure, or any other desirable shape including but not limited to circular, square or rectangular.

Figure 11:
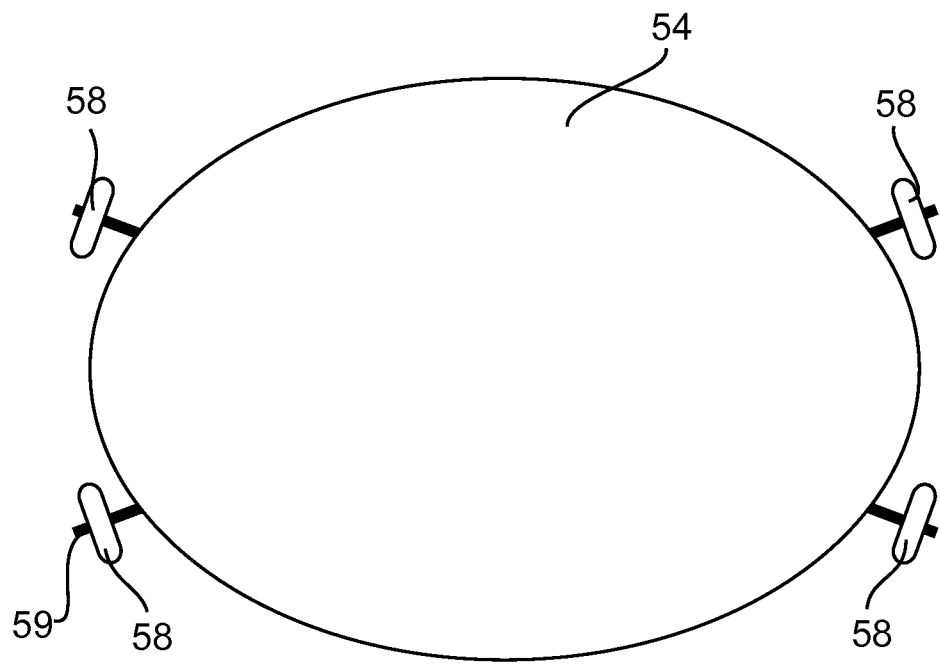
FIG. 11 is a top plan view of one embodiment of a trivet with a rotatable base as an oval.

Referring again to the drawings, FIG. 11 depicts a top view of a particular wheel positioning and an oval shaped basket 54 of a multifaceted trivet in accordance with the present invention. The wheels 58 may have an axel 59 that is substantially aligned with the axel 59 of the wheel 58 on the opposite side of the basket 58.

Figure 12:
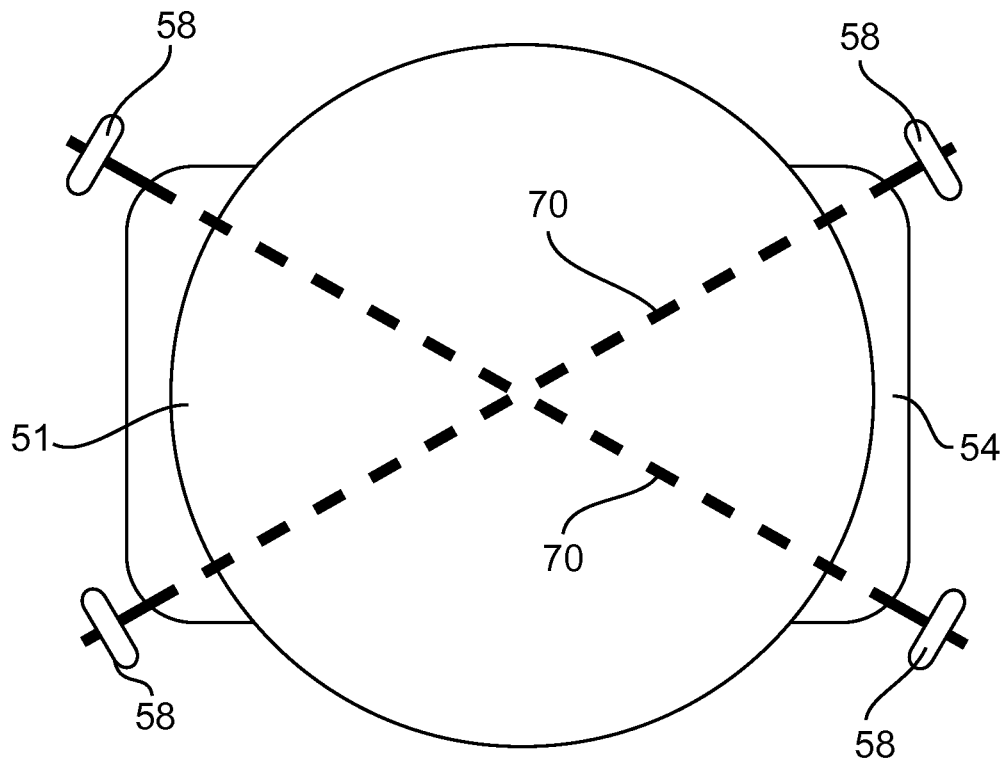
FIG. 12 is a top plan view of another embodiment showing a trivet with a rotatable base in a circular configuration in accordance with the present invention.

As shown in FIG. 12, another particular embodiment of a basket 54 is depicted in accordance with the present invention. The basket 54 may be rectangular with intersecting supports 70. A trivet 51 may be circular and may have a rotating base, wherein the trivet 51 is resting upon the intersecting supports 70 of the basket 54. This allows either the entire basket 54 to be moved on the wheels 58 or the trivet 51 to rotate on its rotatable base. In these particular embodiments, the basket 54 may be moved close to a user and then the use may then rotate the trivet 51 to better access food items with a serving dish supported by the trivet 51.

Figure 13:
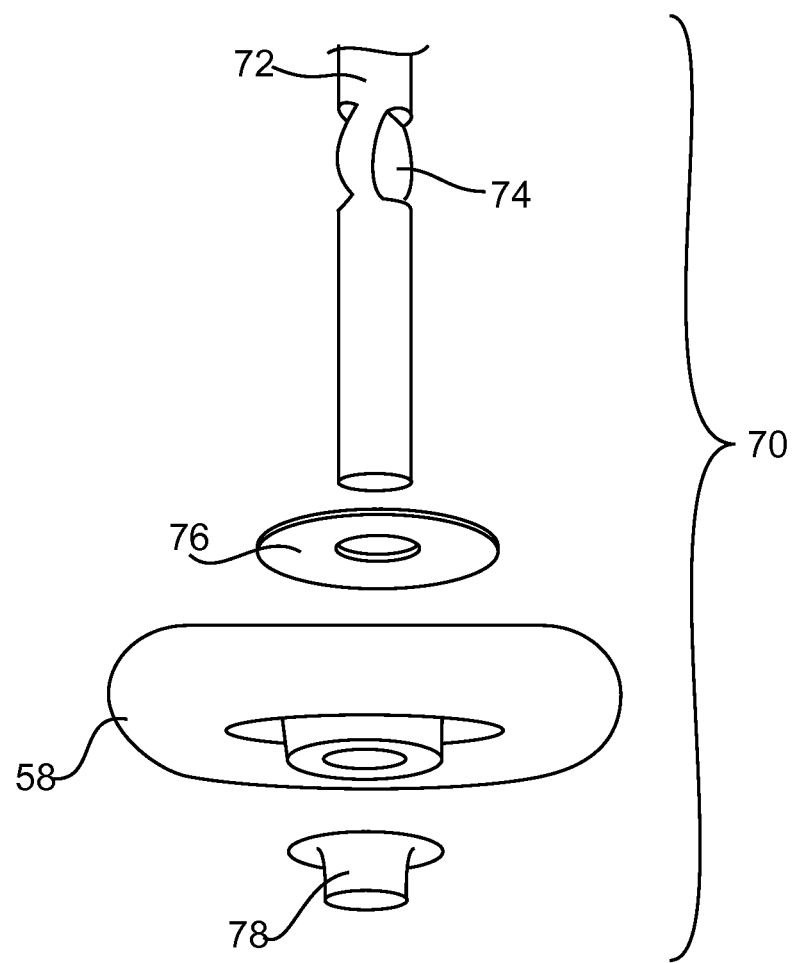
FIG. 13 is an exploded view of a wheel of a trivet with a rotatable base in accordance with the present invention.

Referring to the drawings again, FIG. 13 depicts a more detailed view of the wheels 58 in accordance with embodiments of the present invention. The bottom portion of the handle 56, as shown in FIG. 9 may extend outwardly forming an axel 72. The axel 72 may have a crimped portion 74 to prevent the wheel from moving too far up the axel 72. The construction of a wheel assembly 71 may consists of a washer 76, which may be coupled over the axel 72. The washer 76 may have an inner diameter which prevents it from moving past the crimped portion 74. While any washer suitable for the purposes of this invention may be used, one possible non-limiting washer includes a number 8 SAE zinc plated washer.

After the washer 76 is coupled to the axel 72, the wheel 58 is coupled to the axel 72. While the wheel 58 may also be of any suitable material and size to satisfy the purposes of this invention, one possible non-limiting embodiment utilizes a $7/8^{th}$ inch nylon wheel. After the wheel 58 is coupled to the axel 72, a push nut washer cap 78 is slid over the end of the axel 72. This arrangement holds the wheel 58 in place upon the axel 72 while allowing the wheel 58 to rotate. In one particular embodiment, and without limitation, the push nut washer cap 78 is $3/16^{th}$ of an inch and is steel/zinc plated.

Figure 14:
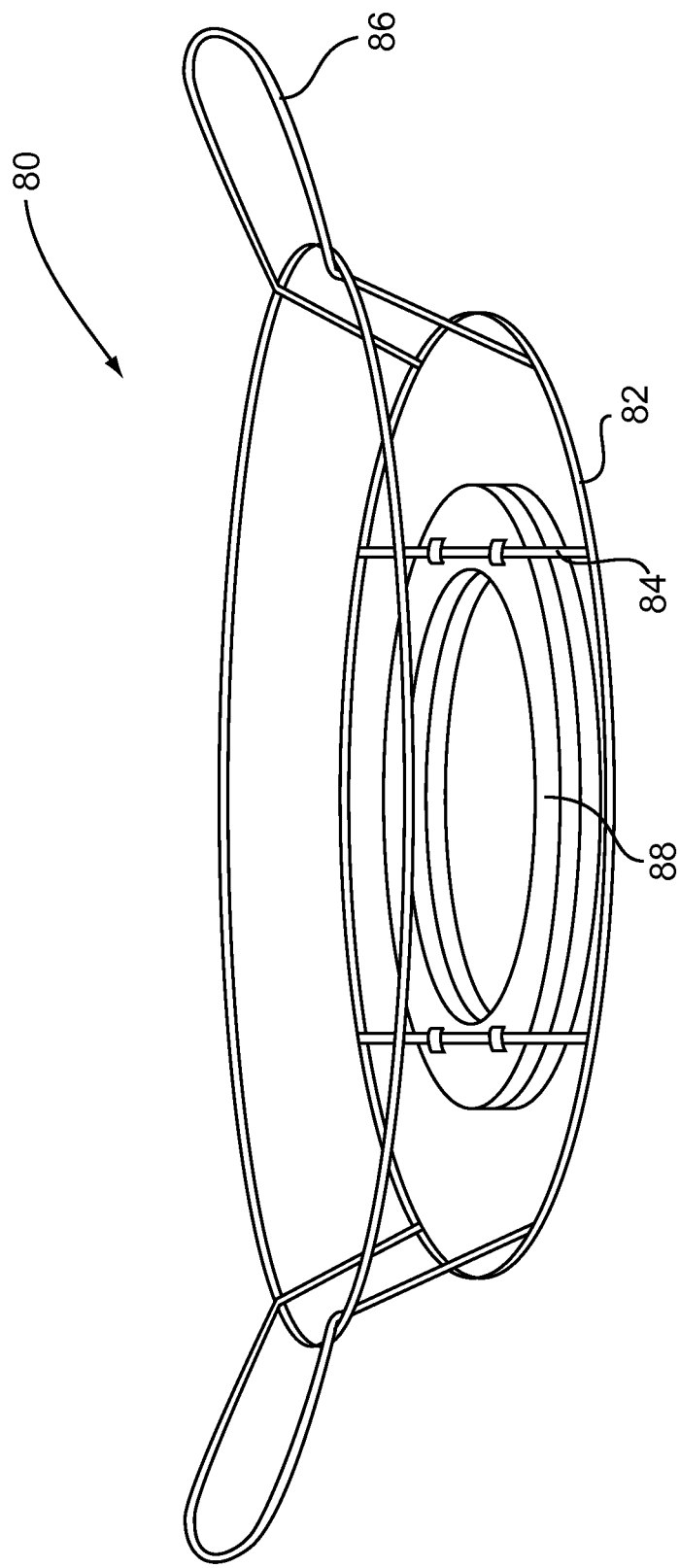
FIG. 14 is a prospective view of an alternate embodiment of a rotatable base in accordance with the present invention.

Referring again to the drawings, FIG. 14 depicts an alternative embodiment of a basket 80 of a multifaceted trivet in accordance with the present invention. The basket 80 may comprise a bottom portion 82 having supports 84. The basket 80 may further include handle 86 for carrying the basket 80. The basket 80 may further include a rotatable base 88 coupled to the supports 84 of the basket 80. This enables the entire basket 80 and any contents therein to rotate upon the base 88.

It will be understood that the heat resistance of the trivet is dependent upon the material from the trivet is formed. The trivet may be heat resistant and used to protect a serving surface to temperatures up to 675 degrees Fahrenheit. For example, a trivet formed of silicone may protect a surface up to 675 degrees Fahrenheit, a trivet formed of wood may be heat resistant up to 350 degrees Fahrenheit and a rattan trivet may be heat resistant up to 535 degrees Fahrenheit. The use of feet adds greater heat resistance by allowing air to pass under the trivet and the serving dish. Particular embodiments may utilize feet that are formed of silicone while the trivet is formed of a different material, such as, but not limited to rattan, wood or ceramic. The silicone feet would provide greater heat resistant particularly at the interface between the trivet and the serving surface. Further, the materials from which the trivets are formed may absorb heat to provide the heat protection from the serving surface.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A combination basket and trivet assembly comprising:
   a basket having a bottom surface, sidewalls and an opening, wherein the bottom surface includes a predetermined size and shape and the sidewalls and bottom surface retain a serving dish having handles placed within the basket through the opening;
   rotatable handles coupled to opposing sidewalls of the basket;
   feet coupled to a bottom side of the bottom surface of the basket, the feet raising the bottom surface a predetermined distance; and
   a trivet removably coupled to the bottom surface of the basket, wherein the trivet comprises substantially integrated handles that extend beyond the handles of The serving dish.

2. The combination basket and trivet assembly of claim 1, wherein the rotatable handles are rotatable between an upward position and a downward position.

3. The combination basket and trivet assembly of claim 1, wherein the predetermined size and shape of the bottom surface of the basket corresponds to the size and shape of the trivet to substantially prevent movement of the trivet once coupled to the bottom surface of the basket.

4. The combined basket and trivet assembly of claim 1, wherein the trivet is moveable between a first position coupled to the bottom surface of the basket with the basket resting on a serving surface and a second position removed from the basket with the trivet resting on the serving surface.

5. The combination basket and trivet assembly of claim 4, wherein the trivet in the first position has greater heat resistance than the trivet in the second position.

6. The combination basket and trivet assembly of claim 1, wherein the basket is in an open configuration.

7. The combination basket and trivet assembly of claim 1, wherein the opposing sidewalls are open below wherein said rotatable handles are coupled.

8. The combination basket and trivet assembly of claim 1, wherein the trivet comprises a ledge angled outward from the bottom surface.

9. The combination basket and trivet of claim 8, wherein the integrated handles are coupled to an outer surface of the ledge.

10. The combination basket and trivet assembly of claim 1, wherein the basket is formed with a heat resistant material.

11. A combination trivet and serving dish assembly comprising:
    a serving dish having handles;
    a trivet having a body portion having a top surface, a bottom surface, a ledge and handles coupled to the top surface of the body portion,
    wherein the trivet is moveable between a position as a lid on the serving dish with the ledge partially resting on sidewalls of the dish and a position as a support and the dish resting on the top surface of the body portion, wherein the trivet handles extend beyond the handles of the serving dish.

12. The combination trivet of and serving dish assembly of claim 11, wherein the ledge is coupled around the periphery of the trivet to prevent the serving dish from sliding off of the trivet during use.

13. The combination trivet and serving dish assembly of claim 12, wherein the ledge is angled outward from the bottom surface.

14. The combination trivet and serving dish assembly of claim 11, wherein the trivet handles are coupled to an outer surface of the ledge.

15. The combination trivet and serving dish assembly of claim 11, wherein the trivet is of a size and shape corresponding to a size and shape of the serving dish, the shape of the trivet including a square, a rectangle, a circle and an oval.

16. A multifaceted trivet, serving dish and basket combination comprising: a serving dish having handles;
- a multifaceted trivet having a body portion, said body portion having a top surface, a bottom surface, a ledge, and handles coupled to the top surface of the body portion;
- wherein the multifaceted trivet is moveable between a position as a lid on the serving dish with the ledge partially resting on sidewalls of the serving dish and a position as a trivet and the serving dish resting on the top surface of the body portion; and
- a basket having a lower peripheral rim, an upper peripheral rim, vertical supports securing the lower peripheral rim to the upper peripheral rim, and at least one horizontal base support secured at its ends to opposing sides of the lower peripheral rim;
- wherein the placement of the trivet as the lid on the serving dish aligns the handles of the trivet in the lid position and the handles of the serving dish juxtapose to each other in a spaced apart relationship such that the handles of the trivet in the lid position are positioned above and extend beyond the handles of the serving dish, whereby a user can selectively engage either the handles of the trivet in the lid position or the serving dish handles or both the handles of the trivet in the lid position and the handles of the serving dish simultaneously.

17. The combination of claim 16, wherein the upper peripheral rim further comprises at least two segments, each segment being substantially U shaped, said U shaped segments opposing each other such that an uppermost portion of legs of the U shaped segments face each other in a spaced apart relationship forming an upper rim opening therebetween.

18. The combination of claim 17, wherein the basket has rotatable handles, said rotatable handles coupled to the upper peripheral rim and spanning the upper rim opening.

19. The combination of claim 18, wherein the rotatable handles are rotatable between an upward position and a downward position.

20. The combination of claim 19, wherein the rotatable handles in their upward position extend over the handles of the trivet in the lid position and the handles of the serving dish when the serving dish is in the basket, whereby the trivet in the lid position and the serving dish are loosely secured within the basket.

* * * * *